Patented Sept. 10, 1946

2,407,302

UNITED STATES PATENT OFFICE 2,407,302

CONDENSATION OF KETENES WITH KETOESTERS

John A. Spence and Edward F. Degering, West Lafayette, Ind., assignors to Purdue Research Foundation, La Fayette, Ind., a corporation of Indiana No Drawing. Application October 2, 1944, Serial No. 556,887

13 Claims. (Cl. 260—484)

This invention relates to the condensation of a ketene with a ketoester.

Ketene is known to react with certain organic and inorganic compounds, and is known to react with itself. However, it has been generally believed that ketene would not react with a ketone, and since the common method for preparing ketene is by the pyrolysis of a ketone, viz. acetone, and since no reaction occurs between the acetone and the ketene, this belief was apparently justified.

Recently it has been found, however, that ketene could be condensed, in the presence of certain acid catalysts, with ketones. See the copending application of Bernard H. Gwynn and Edward F. Degering, Serial No. 459,448, filed September 23, 1942.

We have now found that ketenes can be condensed with ketocarboxylic esters to produce unsaturated carboxylic esters. It is accordingly an object of our invention to provide a process for preparing unsaturated carboxylic esters. A further object is to provide new unsaturated carboxylic esters. Other objects will become apparent hereinafter.

In accordance with our invention, we prepare unsaturated carboxylic esters by condensing a ketene with a ketocarboxylic ester, in the presence of an acid catalyst. Typical of the ketoesters which we employ in practicing our invention are the $\alpha$-ketocarboxylic esters, the $\beta$-ketocarboxylic esters, the $\gamma$-ketocarboxylic esters, the $\delta$-ketocarboxylic esters, etc. The ketocarboxylic ester should be one in which there are at least two hydrogen atoms on a carbon atom or atoms adjacent to the keto carbonyl group. (It is to be noted that we employ herein the term ketocarbonyl group to differentiate from the carbonyl group which is in the carboxylate group of the ketocarboxylic ester.) Preferably the ketocarboxylic ester is one in which there are at least three hydrogen atoms on a carbon atom or atoms adjacent to one of the keto groups, i. e. the three hydrogen atoms can be all on one carbon atom adjacent to the ketocarbonyl group, or two of the hydrogen atoms can be on one carbon atom and the other hydrogen atom can be on another carbon atom adjacent to the ketocarbonyl group.

Among the $\alpha$-ketocarboxylic esters which we employ in practicing our invention are: ethyl pyruvate, ethyl propionylformate, ethyl n-butyrylformate and ethyl isovalerylformate. Among the $\beta$-ketocarboxylic esters which we employ in practicing our invention are: methyl acetoacetate, ethyl acetoacetate, benzyl acetoacetate, methyl $\alpha$-acetylpropionate, ethyl $\alpha$-acetylpropionate, methyl $\alpha$-acetylpropionate, ethyl propionoacetate, methyl n-butyroacetate, phenyl acetoacetate and ethyl decanoylacetate. Among the $\gamma$-ketocarboxylic esters which we employ in practicing our invention are: methyl levulinate and ethyl levulinate. Among the $\delta$-ketocarboxylic esters: ethyl-$\delta$-(n-butyryl)-n-butyrate. Most of these ketocarboxylic esters are well known substances, the preparations of which are described in the literature. In the case of those esters the preparation of which is not described in the literature, the ester can be prepared by heating the sodium salt of the corresponding acid with the appropriate organic iodide. The resulting ester can then be extracted from the cooled reaction mixture with ether and the ester obtained from the ethereal extract.

Generally speaking the best results are obtained with ketocarboxylic esters of the following general formula:

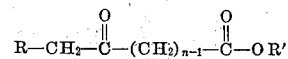

wherein R represents a hydrogen atom, an alkyl group, an aralkyl group or an aryl group, R' represents an alkyl group, an aralkyl group or an aryl group, and n represents 1, 2 or 4 or more. With ketocarboxylic esters of the above formula where n has the value 3, cyclization is likely to take place with the formation of cyclic products. The compounds wherein R in the above general formula represents hydrogen are especially useful in practicing our invention.

Generally speaking two different unsaturated esters are formed when $\beta$-ketocarboxylic esters, $\gamma$-ketocarboxylic esters, $\delta$-ketocarboxylic esters and other ketocarboxylic esters in which the ketocarbonyl group and carboxylate group are separated, are employed. Thus, with ketocarboxylic esters of the following general formula:

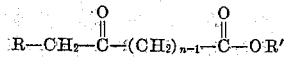

wherein R represents a hydrogen atom, an alkyl group, an aralkyl group or an aryl group, R' represents an alkyl group, an aralkyl group or an aryl group and n represents a positive integer of 2 or more, the following two different unsaturated esters are formed with ketene:

(I) 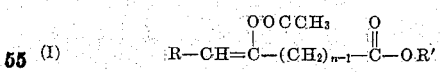

and (II) 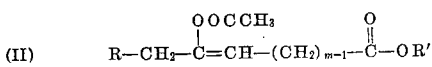

wherein R, R' and $n$ have the values given immediately above and $m$ represents a positive integer. All of the unsaturated esters obtainable by our new process and corresponding to Formula I above are novel. With a ketene of higher molecular weight, unsaturated esters of higher molecular weight (i. e. where the acetate group in the above Formulas I and II is replaced by a higher molecular weight carboxylate group) are obtained.

On the other hand Mingasson reports having prepared the following unsaturated ester:

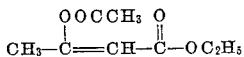

by the action of acetyl chloride on the sodium salt of the enol form of acetoacetic ester. See Bull. soc. chim. (4) 45, 718.

Any ketene selected from those represented by the following general formula can be employed in practicing our invention.

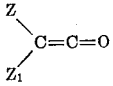

wherein Z and Z' represent a hydrogen atom, an alkyl group, an aralkyl group or an aryl group. The simplest ketene of the formula $CH_2=C=O$ is especially efficacious, we have found.

In practicing our invention, we employ an acid catalyst. Advantageously this acid catalyst is one containing the $-SO_2OH$ group, e. g. sulfuric acid, a halogenosulfonic acid (for instance chlorosulfonic acid) an alkylsulfonic acid (for instance, methylsulfuric acid) or a sulfamic acid (for instance $H_2N-SO_2-OH$ or $(CH_3)_2N-SO_2-OH$). Most advantageously the acid catalyst is one or more of those represented by the following general formula:

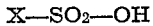

wherein X represents a hydroxyl group, an organic group containing a non-metal in addition to carbon and hydrogen, the X group being linked to the S atom through the said non-metallic atom, or an inorganic group consisting of non-metallic atoms other than carbon. Sulfuric acid is an especially effective catalyst, as are chlorosulfonic acid and sulfamic acid.

In preparing the unsaturated esters of our invention, the ketocarboxylic ester is placed in a reaction vessel along with a small quantity of the acid catalyst, e. g. sulfuric acid. The mixture is then raised to reaction temperature and a ketene, preferably freshly prepared, is added to the mixture at a rate which substantially precludes the building up in the reaction mixture of any substantial quantity of unreacted ketene. The dispersion of the ketene in the reaction mixture is advantageously facilitated by agitation of the reaction mixture. Agitation also aids in avoiding local over-heating of the reaction mixture. The addition of ketene is advantageously continued until a quantity has been added which is at least as much as the molecular equivalent of the quantity of the ketocarboxylic ester present, or until no further reaction takes place.

The ketene employed in practicing our invention can be prepared in any suitable manner. A convenient method for preparing the simplest ketene ($CH_2=C=O$) is by pyrolysis of acetone, removing the small quantity of residual acetone by passing the resulting vapors through a series of cold traps before utilizing the ketene for the condensation reaction of our invention.

The process of our invention takes place over a wide temperature range. Usually we have found that the reaction takes place at an appreciable rate at from about 60° to about 90° C., although higher or lower temperatures can be employed. Especially with higher molecular weight ketocarboxylic esters, higher temperatures must be avoided in order to avoid thermal decomposition of the ester. The heat of reaction may require cooling of the reaction mixture to control the temperature within the desired range.

If desired a reaction medium which is inert to the ketene and the ketocarboxylic ester, e. g. a saturated aliphatic hydrocarbon, or an aromatic hydrocarbon, can be employed. However a reaction medium is unnecessary in the case of most ketocarboxylic esters which are liquid at the reaction temperature employed.

The following examples will serve to illustrate further the manner of practicing our invention.

*Example I*

Sixty-five parts of dried, redistilled ethyl acetoacetate (0.5 mole) were placed in a reaction vessel and .5 part (.003 mole) of concentrated sulfuric acid was added to the vessel. The temperature was raised to 70° C. and was maintained approximately constant within ±5° C. while ketene, prepared as described above, was added at a rate of between .15 to .2 mole per hour for a period of four hours during which time the mixture was continuously agitated. A slight amount of heat was generated by the reaction, and a slight yellow coloration appeared which gradually darkened.

The reaction mixture was distilled at 10 mm. pressure which resulted in 52 parts of a fraction boiling between 90° and 95° C. at that pressure. This fraction was rectified and produced 42 parts of the unsaturated acetate which boiled at 89° C. at 10 mm. pressure, corresponding to a yield based on the ethyl acetoacetate of 54%.

Analysis: Calculated for the unsaturated acetate: C, 55.30, H, 6.98. Found: C, 55.9; 56.1; H, 6.64, 7.02.

The unsaturated acetate was a mixture of two compounds having the following formulas:

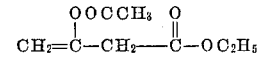

and

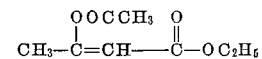

The latter compound constituted a very large proportion of the mixture.

*Example II*

Sixty parts of ethyl levulinate and .5 part (.003 mole) of concentrated sulfuric acid were placed in a reaction vessel and the temperature was raised to 85° C. Ketene prepared as above described was added at a rate of about .1 mole per hour for four hours, with continuous agitation of the mixture.

The reaction mixture was rectified, yielding a 16 ml. fraction which boiled at 103–108° C. at 12 mm. The yield was 21.5% of unsaturated acetate.

Analysis: Calculated for the unsaturated acetate: C, 58.05; H, 7.57. Found: C, 57.1; 56.1; H, 7.89, 7.66.

The unsaturated acetate was a mixture of two compounds having the following formulas:

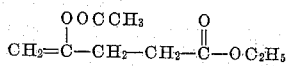

and

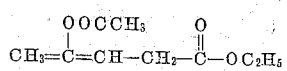

Both compounds were present in sizeable proportions.

In a similar manner any of the other ketocarboxylic esters can be condensed with ketenes. Small amounts of water may be present in any of the reaction mixtures without adversely affecting the process.

The proper quantity of acid employed as catalyst in these condensations will vary with the rate of addition of the ketene, and an increased rate of addition demands a greater amount of catalyst. When operating at the most desirable rate of addition, we have found that the yield of unsaturated ester increases slowly at about the same rate as the concentration of acid is increased. When high concentrations of catalyst are employed, however, the ratio of polymerization of ketene to the formation of unsaturated ester increases sharply, and the yield of unsaturated ester drops off sharply.

What we claim as our invention and desire to be secured by Letters Patent of the United States is:

1. A process for preparing an unsaturated carboxylic ester comprising condensing, in the presence of an acid catalyst selected from those represented by the following general formula:

$$X-SO_2-OH$$

wherein X represents a member selected from the group consisting of a halogen atom, a hydroxyl group, and an organic group containing at least one non-metallic atom selected from the group consisting of oxygen and nitrogen, said organic group being attached to the S atom through said non-metallic atom, a ketene with a ketocarboxylic ester in which there is a total of at least two hydrogen atoms on the carbon atoms adjacent to the ketocarbonyl group.

2. A process for preparing an unsaturated carboxylic ester comprising condensing, in the presence of an acid catalyst selected from those represented by the following general formula:

$$X-SO_2-OH$$

wherein X represents a member selected from the group consisting of a halogen atom, a hydroxyl group, and an organic group containing at least one non-metallic atom selected from the group consisting of oxygen and nitrogen, said organic group being attached to the S atom through said non-metallic atom, a ketene with a ketocarboxylic ester in which there is a total of at least three hydrogen atoms on the carbon atoms adjacent to the ketocarbonyl group.

3. A process for preparing an unsaturated carboxylic ester comprising condensing, in the presence of an acid catalyst selected from those represented by the following general formula:

$$X-SO_2-OH$$

wherein X represents a member selected from the group consisting of a halogen atom, a hydroxyl group, and an organic group containing at least one non-metallic atom selected from the group consisting of oxygen and nitrogen, said organic group being attached to the S atom through said non-metallic atom, a ketene with a ketocarboxylic ester selected from those represented by the following general formula:

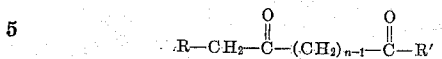

wherein R represents a member selected from the group consisting of a hydrogen atom, an alkyl group, an aralkyl group and an aryl group, R' represents a member selected from the group consisting of an alkyl group, an aralkyl group and an aryl group, and n represents a positive integer selected from the group consisting of 1, 2 and 4.

4. A process for preparing an unsaturated carboxylic ester comprising condensing, in the presence of sulfuric acid, a ketene with a ketocarboxylic ester selected from those represented by the following general formula:

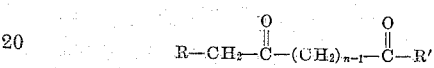

wherein R represents a member selected from the group consisting of a hydrogen atom, an alkyl group, an aralkyl group and an aryl group, R' represents a member selected from the group consisting of an alkyl group, an aralkyl group and an aryl group, and n represents a positive integer selected from the group consisting of 1, 2 and 4.

5. A process for preparing an unsaturated carboxylic ester comprising condensing, in the presence of sulfamic acid, a ketene with a ketocarboxylic ester selected from those represented by the following general formula:

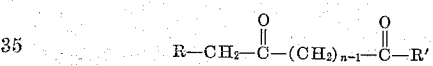

wherein R represents a member selected from the group consisting of a hydrogen atom, an alkyl group, an aralkyl group and an aryl group, R' represents a member selected from the group consisting of an alkyl group, an aralkyl group and an aryl group, and n represents a positive integer selected from the group consisting of 1, 2 and 4.

6. A process for preparing an unsaturated carboxylic ester comprising condensing, in the presence of chlorosulfonic acid, a ketene with a ketocarboxylic ester selected from those represented by the following general formula:

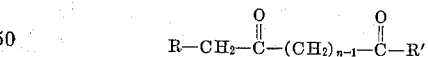

wherein R represents a member selected from the group consisting of a hydrogen atom, an alkyl group, an aralkyl group and an aryl group, R' represents a member selected from the group consisting of an alkyl group, an aralkyl group and an aryl group, and n represents a positive integer selected from the group consisting of 1, 2, and 4.

7. A process for preparing an unsaturated acetate comprising condensing, in the presence of an acid catalyst selected from those represented by the following general formula:

$$X-SO_2-OH$$

wherein X represents a member selected from the group consisting of a halogen atom, a hydroxyl group, and an organic group containing at least one non-metallic atom selected from the group consisting of oxygen and nitrogen, said organic group being attached to the S atom through said non-metallic atom, ketene with a ketocarboxylic ester in which there is a total of at least two hydrogen atoms on the carbon atoms adjacent to the ketocarbonyl group.

8. A process for preparing an unsaturated acetate comprising condensing, in the presence of an acid catalyst selected from those represented by the following general formula:

$$X-SO_2-OH$$

wherein X represents a member selected from the group consisting of a halogen atom, a hydroxyl group, and an organic group containing at least one non-metallic atom selected from the group consisting of oxygen and nitrogen, said organic group being attached to the S atom through said non-metallic atom, ketene with a keto-carboxylic ester in which there is a total of at least three hydrogen atoms on the carbon atoms adjacent to the ketocarbonyl group.

9. A process for preparing an unsaturated acetate comprising condensing, in the presence of an acid catalyst selected from those represented by the following general formula:

$$X-SO_2-OH$$

where X represents a member selected from the group consisting of a halogen atom, a hydroxyl group, and an organic group containing at least one non-metallic atom selected from the group consisting of oxygen and nitrogen, said organic group being attached to the S atom through said non-metallic atom, ketene with a ketocarboxylic ester selected from those represented by the following general formula:

$$R-CH_2-\overset{O}{\underset{\|}{C}}-(CH_2)_{n-1}-\overset{O}{\underset{\|}{C}}-R'$$

wherein R represents a member selected from the group consisting of a hydrogen atom, an alkyl group, an aralkyl group and an aryl group, R' represents a member selected from the group consisting of an alkyl group, an aralkyl group and an aryl group, and $n$ represents a positive integer selected from the group consisting of 1, 2 and 4.

10. A process for preparing an unsaturated acetate comprising condensing, in the presence of sulfuric acid, ketene with a ketocarboxylic ester selected from those represented by the following general formula:

$$R-CH_2-\overset{O}{\underset{\|}{C}}-(CH_2)_{n-1}-\overset{O}{\underset{\|}{C}}-R'$$

wherein R represents a member selected from the group consisting of a hydrogen atom, an alkyl group, an aralkyl group and an aryl group, R' represents a member selected from the group consisting of an alkyl group, an aralkyl group and an aryl group, and $n$ represents a positive integer selected from the group consisting of 1, 2 and 4.

11. A process for preparing an unsaturated acetate comprising condensing, in the presence of sulfamic acid, ketene with a ketocarboxylic ester selected from those represented by the following general formula:

$$R-CH_2-\overset{O}{\underset{\|}{C}}-(CH_2)_{n-1}-\overset{O}{\underset{\|}{C}}-R'$$

wherein R represents a member selected from the group consisting of a hydrogen atom, an alkyl group, an aralkyl group and an aryl group, R' represents a member selected from the group consisting of an alkyl group, an aralkyl group and an aryl group, and $n$ represents a positive integer selected from the group consisting of 1, 2 and 4.

12. A process for preparing an unsaturated acetate comprising condensing, in the presence of chlorosulfonic acid, ketene with a ketocarboxylic ester selected from those represented by the following general formula:

$$R-CH_2-\overset{O}{\underset{\|}{C}}-(CH_2)_{n-1}-\overset{O}{\underset{\|}{C}}-R'$$

wherein R represents a member selected from the group consisting of a hydrogen atom, an alkyl group, an aralkyl group and an aryl group, R' represents a member selected from the group consisting of an alkyl group, an aralkyl group and an aryl group, and $n$ represents a positive integer selected from the group consisting of 1, 2 and 4.

13. A process for preparing an unsaturated acetate comprising condensing, in the presence of sulfuric acid, ketene with ethyl acetoacetate.

JOHN A. SPENCE.
EDWARD F. DEGERING.